(12) United States Patent
Kim et al.

(10) Patent No.: US 12,404,703 B2
(45) Date of Patent: Sep. 2, 2025

(54) VEHICLE CONTROL APPARATUS AND METHOD THEREOF

(71) Applicants: Hyundai Motor Company, Seoul (KR); Kia Corporation, Seoul (KR)

(72) Inventors: Min Soo Kim, Anyang-si (KR); Soo Man Jung, Hwaseong-si (KR); Young Bum Cho, Seoul (KR); Chang Woo Sohn, Seoul (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 186 days.

(21) Appl. No.: 18/490,058

(22) Filed: Oct. 19, 2023

(65) Prior Publication Data
US 2024/0376750 A1    Nov. 14, 2024

(30) Foreign Application Priority Data
May 14, 2023   (KR) .......................... 10-2023-0062093

(51) Int. Cl.
| | |
|---|---|
| E05B 77/02 | (2014.01) |
| B60Q 9/00 | (2006.01) |
| B60W 10/18 | (2012.01) |
| B60W 10/30 | (2006.01) |
| B60W 30/09 | (2012.01) |
| E05B 85/10 | (2014.01) |
| G08G 1/16 | (2006.01) |

(52) U.S. Cl.
CPC .............. *E05B 77/02* (2013.01); *B60Q 9/008* (2013.01); *B60W 10/18* (2013.01); *B60W 10/30* (2013.01); *B60W 30/09* (2013.01); *E05B 85/107* (2013.01); *G08G 1/166* (2013.01); *B60W 2520/10* (2013.01); *B60W 2530/00* (2013.01); *B60W 2554/802* (2020.02); *B60W 2710/18* (2013.01); *B60W 2710/30* (2013.01)

(58) Field of Classification Search
CPC .......... E05B 77/02; E05B 77/04; E05B 77/10; E05B 77/12; E05B 85/107
See application file for complete search history.

(56) References Cited

U.S. PATENT DOCUMENTS

| | | | |
|---|---|---|---|
| 2013/0076047 A1* | 3/2013 | Wheeler ............... | E05B 85/103 292/336.3 |
| 2017/0096843 A1* | 4/2017 | Seo ......................... | E05B 79/20 |
| 2020/0263455 A1* | 8/2020 | Nam ....................... | E05B 77/04 |

(Continued)

*Primary Examiner* — Sizo B Vilakazi
(74) *Attorney, Agent, or Firm* — SLATER MATSIL, LLP

(57) ABSTRACT

A vehicle control apparatus includes a processor, a forward detection device configured to identify an external object in front of the vehicle, a door handle driving device configured to control a position of a door handle relative to a door part of the vehicle, and a collision detection device configured to identify whether there is a collision of the vehicle. The processor is configured to identify whether a first signal is received from the forward detection device based on a speed of the vehicle and a distance between the vehicle and the external object, to transmit a second signal to the door handle driving device for moving the door handle to a first position outward relative to the door part, and to maintain a state where the door handle is at the first position based on receiving a third signal from the collision detection device.

20 Claims, 5 Drawing Sheets

(56) References Cited

U.S. PATENT DOCUMENTS

| | | | |
|---|---|---|---|
| 2022/0042355 A1* | 2/2022 | Heyduck | E05B 77/02 |
| 2022/0355762 A1* | 11/2022 | Yang | B60R 21/013 |
| 2024/0011334 A1* | 1/2024 | Jung | E05B 77/12 |

* cited by examiner

VEHICLE CONTROL APPARATUS AND METHOD THEREOF

CROSS-REFERENCE TO RELATED APPLICATIONS

This application claims the benefit of Korean Patent Application No. 10-2023-0062093, filed on May 14, 2023, which application is hereby incorporated herein by reference.

TECHNICAL FIELD

The present disclosure relates to vehicle control devices and methods thereof.

BACKGROUND

A door handle basically forms a plane with the surface of a door part on a vehicle. The door handle in a pushed-in state where a user is unable to use the door handle and in a pulled-out state where it is possible for the user who wants to open the door part as the door handle pivots to operate the door handle is generally provided.

In general, the door handle is in a state where it is pushed in the door part when the vehicle is operating at a fast speed and is in a state where it is pulled out from the door part when the vehicle is operating at a slow speed and is stopped.

When the vehicle is operating, a vehicle control apparatus may identify an external object in front of the vehicle. The vehicle control apparatus may notify the user that the external object is identified, using a hardware component provided in the vehicle, in response to identifying the external object.

Furthermore, the vehicle control apparatus may cause the vehicle to brake, using at least one of a speed of the vehicle, a type of the external object, a distance between the vehicle and the external object, or any combination thereof.

In an existing technology, although the vehicle control apparatus identifies the external object, when an accident occurs in a state where the door handle is pushed in the door part and the battery is destroyed by fire, without controlling the door handle, it is difficult to rescue passengers who ride in the vehicle.

SUMMARY

The present disclosure relates to a vehicle control apparatus and a method thereof, and more particularly, relates to technologies associated with a state of a door handle pushed in a door part of a vehicle or pulled out from the door part. The present disclosure has been made to solve the above-mentioned problems occurring in the prior art while advantages achieved by the prior art may be maintained intact.

An embodiment of the present disclosure provides a vehicle control apparatus for pulling a door handle out from a door part, based on at least one of a distance between a vehicle including the vehicle control apparatus and an external object, a speed of the vehicle, or a combination thereof and a method thereof.

Another embodiment of the present disclosure provides a vehicle control apparatus for maintaining a state where a door handle is pulled out, based on identifying a collision of a vehicle including the vehicle control apparatus, and a method thereof.

Another embodiment of the present disclosure provides a vehicle control apparatus for maintaining a state where a door handle is pulled out from a door part, although a battery is discharged (or is destroyed by fire) when a vehicle collides to help a passenger to be rescued after an accident occurs, and a method thereof.

Another embodiment of the present disclosure provides a vehicle control apparatus for pulling out a door handle pushed in a door part in advance before an accident occurs to maintain aesthetic appearance to help a passenger to be rescued when an accident occurs, and a method thereof.

The technical problems to be solved by the present disclosure are not necessarily limited to the aforementioned problems, and any other technical problems not mentioned herein may be clearly understood from the following description by those skilled in the art to which the present disclosure pertains.

According to an embodiment of the present disclosure, a vehicle control apparatus may include a processor, a forward detection device that identifies an external object different from a vehicle, the external object being in front of the vehicle, a door handle driving device that controls a door handle pushed in a door part of the vehicle or pulled out from the door part, and a collision detection device that identifies whether there is a collision of the vehicle.

In an embodiment, the processor may identify whether to receive a first signal based on at least one of a distance between the vehicle and the external object, a speed of the vehicle, or any combination thereof, from the forward detection device, when the vehicle is operated at a speed of a specified range, may transmit a second signal for pulling the door handle out from the door handle driving device, based on receiving the first signal, and may maintain a state where the door handle is pulled out, based on receiving a third signal responding to the collision of the vehicle from the collision detection device, in the state where the door handle is pulled out by the door handle driving device responding to receiving the second signal.

In an embodiment, the processor may transmit a fourth signal for pushing the door handle into the door handle driving device, based on not receiving the third signal from the collision detection device.

In an embodiment, the processor may transmit a fourth signal for pushing the door handle into the door handle driving device, in response to the speed of the vehicle being identified as being greater than or equal to a specified speed, and based on not receiving the third signal from the collision detection device.

In an embodiment, the processor may transmit a fourth signal for pushing the door handle into the door handle driving device, based on not receiving the first signal from the collision detection device, when the vehicle is operated at the speed of the specified range.

In an embodiment, the specified range may be that the speed of the vehicle includes at least one of a first specified range, a second specified range with a maximum value less than a maximum value of the first specified range, or any combination thereof.

In an embodiment, the processor may apply acceleration including a first acceleration to cause the vehicle to brake, in response to the first signal received based on the speed of the vehicle, the speed being identified in the first specified range.

In an embodiment, the processor may apply acceleration including a second acceleration with an absolute value greater than an absolute value of the first acceleration to cause the vehicle to brake, in response to the first signal received based on the speed of the vehicle, the speed being identified in the second specified range.

In an embodiment, the processor may provide a notification that the external object is identified, by means of at least one of a speaker provided in the vehicle, a display provided in the vehicle, a seat vibrator provided in the vehicle, or any combination thereof, in response to that the distance between the vehicle and the external object being identified as being less than or equal to a specified distance.

According to an embodiment of the present disclosure, a vehicle control method may include identifying whether to receive a first signal based on at least one of a distance between a vehicle and an external object, a speed of the vehicle, or any combination thereof, from a forward detection device configured to identify the external object different from the vehicle, the external object being in front of the vehicle, when the vehicle is operated at a speed in a specified range, transmitting a second signal, for pulling a door handle pushed in a door part of the vehicle or pulled out from the door part, to a door handle driving device configured to control the door handle, based on receiving the first signal, and maintaining a state where the door handle is pulled out, based on receiving a third signal responding to a collision of the vehicle from a collision detection device configured to identify whether there is the collision of the vehicle, in a state where the door handle is pulled out by the door handle driving device in response to receiving the second signal.

In an embodiment, the vehicle control method may further include transmitting a fourth signal for pushing the door handle into the door handle driving device, based on not receiving the third signal from the collision detection device.

In an embodiment, the vehicle control method may further include transmitting a fourth signal for pushing the door handle into the door handle driving device, based on the speed of the vehicle being identified as being greater than or equal to a specified speed, and based on not receiving the third signal from the collision detection device.

In an embodiment, the vehicle control method may further include transmitting a fourth signal for pushing the door handle into the door handle driving device, based on not receiving the first signal from the forward detection device, when the vehicle is operated at the speed in the specified range.

In an embodiment, the specified range may be that the speed of the vehicle is included in at least one of a first specified range, a second specified range with a maximum value greater than a maximum value of the first specified range, or any combination thereof.

In an embodiment, the vehicle control method may further include applying acceleration including first acceleration to cause the vehicle to brake, in response to the first signal being received based on the speed of the vehicle, and the speed being identified in the first specified range.

In an embodiment, the vehicle control method may further include applying acceleration including second acceleration with an absolute value greater than an absolute value of the first acceleration to cause the vehicle to brake, in response to the first signal being received based on the speed of the vehicle, and the speed being identified in the second specified range.

In an embodiment, the vehicle control method may further include providing a notification that the external object is identified, by at least one of a speaker provided in the vehicle, a display provided in the vehicle, a seat vibrator provided in the vehicle, or a handle vibrator provided in the vehicle, or any combination thereof, in response to identifying the external object in a specified distance or less.

BRIEF DESCRIPTION OF THE DRAWINGS

The above and other features and advantages of the present disclosure may be more apparent from the following detailed description taken in conjunction with the accompanying drawings.

DETAILED DESCRIPTION OF ILLUSTRATIVE EMBODIMENTS

Figure 1:
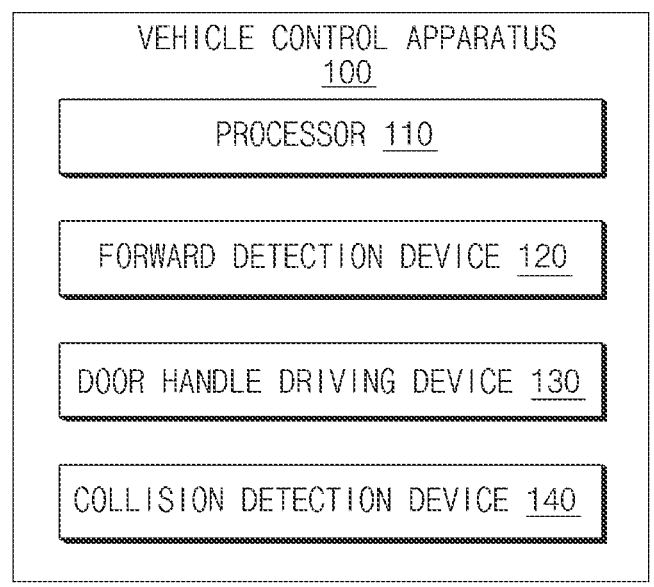
FIG. 1 illustrates an example of a block diagram of a vehicle control apparatus according to an embodiment of the present disclosure.

Hereinafter, some embodiments of the present disclosure will be described in detail with reference to the exemplary drawings. In the drawings, the same reference numerals will be used throughout to designate the same or equivalent elements. In addition, a detailed description of well-known features or functions may be omitted to not unnecessarily obscure the gist of the present disclosure.

In describing elements of exemplary embodiments of the present disclosure, the terms first, second, A, B, (a), (b), and the like may be used herein. These terms may be only used to distinguish one element from another element, but do not necessarily limit the corresponding elements irrespective of the order or priority of the corresponding elements. Furthermore, unless otherwise defined, all terms including technical and scientific terms used herein are to be interpreted as is customary in the art to which this disclosure pertains. It will be understood that terms used herein should be interpreted as having a meaning that is consistent with their meaning in the context of this disclosure and the relevant art and should not be interpreted in an idealized or overly formal sense unless expressly so defined herein.

Hereinafter, embodiments of the present disclosure will be described in detail with reference to FIGS. 1 to 5.

FIG. 1 illustrates an example of a block diagram of a vehicle control apparatus according to an embodiment of the present disclosure.

Referring to FIG. 1, a vehicle control apparatus 100 according to an embodiment of the present disclosure may be implemented inside or outside a vehicle, and some of the components included in the vehicle control apparatus 100 may be implemented inside or outside the vehicle. In this case, the vehicle control apparatus 100 may be integrally configured with control units in the vehicle or may be implemented as a separate device to be connected with the control units of the vehicle by separate connections. The components of the vehicle control apparatus 100, which are shown in FIG. 1, are illustrative, and embodiments of the present disclosure are not necessarily limited thereto. For example, the vehicle control apparatus 100 may further include components which are not shown in FIG. 1.

According to an embodiment, the vehicle control apparatus 100 may include a processor 110, a forward detection device 120, a door handle driving device 130, and a collision detection device 140. The processor 110, the front detection device 120, the door handle driving device 130, and the collision detection device 140 may be electronically or operably coupled with each other by an electronic component including a communication bus.

The processor 110 of the vehicle control apparatus 100 according to an embodiment may include a hardware component for processing data based on one instruction or two or more instructions. For example, the hardware component for processing the data may include an arithmetic and logic unit (ALU), a field programmable gate array (FPGA), a central processing unit (CPU), or any combination thereof.

The number of processors 110 may be one or more in number. For example, the processor 110 may have a structure of a multi-core processor such as a dual core, a quad core, or a hexa core, or may have a structure of one processor such as a single core. For example, one instruction or two or more instructions may be stored in a memory (not shown).

The forward detection device 120 of the vehicle control apparatus 100 according to an embodiment may include at least one of an image sensor, a time of flight (ToF) sensor, a light detection and ranging (LiDAR) sensor, a structured light, an ultrasonic sensor, an infrared sensor, an optical distance sensor, or any combination thereof. For example, the forward detection device 120 may include at least one of a forward collision-avoidance assist (FCA) device, an advanced emergency braking system (AEB) device, a collision avoidance system (CAS) device, or any combination thereof.

The forward detection device 120 may be located on the front of the vehicle. For example, the forward detection device 120 may be located to face forward at the front of the vehicle to identify an external object different from the vehicle including the vehicle control apparatus 100. The external object different from the vehicle including the vehicle control apparatus 100 may include at least one of a person, an outside vehicle different from the vehicle including the vehicle control apparatus 100, a bicycle or a person riding the bicycle, or a thing including a wall, or any combination thereof. However, various embodiments of the present disclosure are not limited thereto.

For example, when the vehicle is operated at a speed in a specified range, the forward detection device 120 may detect the front of the vehicle including the vehicle control apparatus 100 and may identify a distance between the vehicle including the vehicle control apparatus 100 and the external object. For example, the speed in the specified range may include a speed which is greater than or equal to about 5 km/h and is less than or equal to about 200 km/h. For example, the forward detection device 120 may transmit a first signal indicating that the external object is identified to the processor 110, based on the distance between the vehicle and the external object being identified as being less than or equal to a specified distance. Herein, the specified distance may have a variable value based on the speed of the vehicle. For example, as the speed of the vehicle is faster, the specified distance may have a larger value. As the speed of the vehicle is slower, the specified distance may have a smaller value.

For example, the forward detection device 120 may transmit the first signal to the processor 110, based on at least one of the distance between the vehicle and the external object, or the speed of the vehicle, or any combination thereof. As another example, the forward detection device 120 may transmit the first signal to the processor 110, based on at least one of a type of the external object, a motion state of the external object, or a speed of the vehicle, or any combination thereof. A description about the forward detection device 120 will be given below with reference to FIG. 2.

The processor 110 of the vehicle control apparatus 100 according to an embodiment may notify a passenger of the vehicle that the external object is identified, by way of at least one of a speaker included the vehicle, a display included the vehicle, a seat vibrator included the vehicle, a handle vibrator included the vehicle, or any combination thereof, in response to receiving the first signal from the forward detection device 120. For example, the processor 110 may warn the passenger that the external object is identified, using at least one of the speaker provided in the vehicle, the display provided in the vehicle, the seat vibrator provided in the vehicle, the handle vibrator provided in the vehicle, or any combination thereof, in response to receiving the first signal from the forward detection device 120.

For example, the processor 110 may output a sound indicating that the external object is identified, using the speaker included in the vehicle, in response to receiving the first signal. For example, the processor 110 may display something on a screen indicating that the external object is identified, using the display included in the vehicle, in response to receiving the first signal. For example, the processor 110 may cause the seat vibrator included in the vehicle to vibrate, in response to receiving the first signal. For example, the processor 110 may cause the handle vibrator included in the vehicle to vibrate, in response to receiving the first signal.

The door handle driving device 130 of the vehicle control apparatus according to an embodiment may transmit or receive a signal for controlling the door handle located in the door part of the vehicle including the vehicle control apparatus 100. For example, the door handle driving device 130 may control the door handle pushed in the door part of the vehicle or pulled out from the door part of the vehicle. The door handle pushed in the door part of the vehicle or pulled out from the door part of the vehicle may include, but is not limited to, a flush interior door handle and/or a flush outside door handle.

For example, the door handle driving device 130 may receive a second signal for pulling the door handle out from the processor 110. Upon or after receiving the second signal, the door handle driving device 130 may pull the door handle out from the door part.

In another embodiment, the processor 110 may control an actuator which is directly or indirectly connected with the door handle to control the door handle with its mechanical operation. For example, the processor 110 may pull the door handle out from the door part, based on a distance between the vehicle and the external object, a speed of the vehicle, or any combination thereof.

The collision detection device 140 of the vehicle control apparatus 100 according to an embodiment may identify whether there is a collision of the vehicle including the vehicle control apparatus 100. For example, the collision detection device 140 may identify whether there is a collision of the vehicle, based on an acceleration of the vehicle, based on a pressure acting on the vehicle, or any combination thereof. For example, the collision detection device 140 may transmit a third signal responding to the collision of the vehicle to the processor 110, in response to a collision of a front surface of the vehicle, a side surface of the vehicle, or a rear surface of the vehicle, or any combination thereof. In a state where the door handle is pulled out by the door handle driving device 130 in response to the reception of the second signal, the processor 110 may maintain the state where the door handle is pulled out, based on receiving the third signal corresponding to a collision of the vehicle from the collision detection device 140.

For example, the collision detection device 140 may identify that a force of reference intensity or more acts on at least one of the front surface of the vehicle, the side surface of the vehicle, the rear surface of the vehicle, or any combination thereof. The collision detection device 140 may identify that the vehicle collides, in response to the force detected being greater than a force of reference intensity. The collision detection device 140 may identify the collision of the vehicle (in response to the force detected being greater than a force of reference intensity) and may transmit the third signal to the processor 110, indicating a collision of the vehicle.

In a state where the door handle is pulled out, the processor 110 of the vehicle control apparatus 100 according to an embodiment may fail to receive the third signal corresponding to a collision detected by the collision detection device 140. In another embodiment, in a state where the door handle is pulled out, the processor 110 may transmit a fourth signal for pushing the door handle in, based on not receiving the third signal from the collision detection device 140. In another embodiment, in a state where the door handle is pulled out, the processor 110 may transmit the four signal for pushing the door handle into the door handle driving device 130, based on not receiving the third signal from the collision detection device 140 during a specified duration of time.

In another embodiment, in a state where the door handle is pulled out, the processor 110 may control an actuator, that is directly or indirectly connected with the door handle to control the door handle with its mechanical operation, and may push the door handle in, based on not receiving the third signal corresponding to a collision of the vehicle from the collision detection device 140 during a specified duration of time.

As described above, the processor 110 of the vehicle control apparatus 100 according to an embodiment may pull the door handle out in response to the first signal based on at least one of a distance between the vehicle and an external object, a speed of the vehicle, or any combination thereof, when the vehicle including the vehicle control apparatus 100 is operated at a speed in a specified range. In a state where the door handle is pulled out, the processor 110 may maintain the state the door handle is pulled out, based on receiving a third signal corresponding to a collision of the vehicle from the collision detection device 140. The processor 110 may maintain the state where the door handle is pulled out, although the battery is discharged or disconnected (or is ejected from the vehicle) due to the vehicle collision, thus helping a vehicle occupant to be rescued after a vehicle crash/collision.

Figure 2:
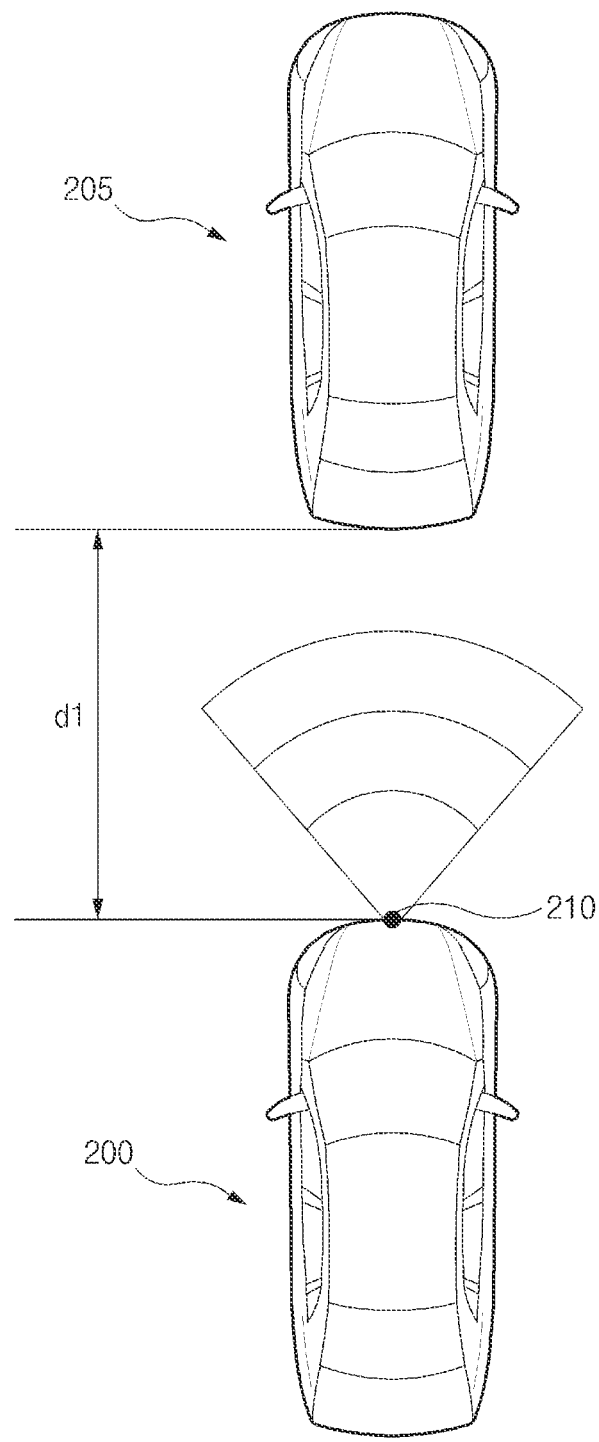
FIG. 2 illustrates an example of detecting an external object in a vehicle control apparatus according to an embodiment of the present disclosure.

FIG. 2 illustrates an example of detecting an external object in a vehicle control apparatus according to an embodiment of the present disclosure. A vehicle 200 of FIG. 2 may include all or a part of a vehicle control apparatus 100 of FIG. 1. Operations of FIG. 2 may be performed by a processor 110 of FIG. 1. An external object different from the vehicle 200 is illustrated as an outside vehicle 205 in FIG. 2, but not limited thereto. For example, the external object 205 may include at least one of an outside vehicle, a person, a motorcycle, a bicycle, a person riding a motorcycle/bicycle, a thing including a wall, or any combination thereof. However, various embodiments of the present disclosure are not limited thereto.

Referring to FIG. 2, the vehicle 200 including the vehicle control apparatus 100 according to an embodiment may include a forward detection device 210 for identifying the external object 205 (external object different from the vehicle 200), which is in front of the vehicle 200. The forward detection device 210 may include a forward detection device 120 of FIG. 1. For example, the forward detection device 210 may identify the external object 205, when the vehicle 200 including the vehicle control apparatus 100 is operated at a speed in a specified range, or may identify the external object 205 regardless whether the vehicle 200 is having a speed in the specified range.

In an embodiment, the forward detection device 210 may detect the external object 205 based on at least one of an image sensor, a time of flight (ToF) sensor, a light detection and ranging (LiDAR) sensor, a structured light, an ultrasonic sensor, an infrared sensor, an optical distance sensor, or any combination thereof, for example. When the vehicle 200 is operated at a speed in the specified range, the forward detection device 210 may identify the external object 205, based on at least one of a distance di between the vehicle 200 and the external object 205, a speed of the vehicle 200, a type of the external object 205, or any combination thereof, and may transmit a first signal indicating that the external object 205 is identified to a processor. The speed in the specified range may be referred to as one of the speed intervals that will be described below. And below, a description will be given below of the processor which performs a different operation, based on at least one of a type of the external object 205 or a speed of the vehicle 200, or any combination thereof.

In an embodiment, the forward detection device 210 may execute one or more of a first mode, a second mode, or a third mode. For example, when each of the first mode, the second mode, and the third mode is executed, the forward detection device 210 may identify the external object 205 in a different speed interval. Below, a description will be given of the forward detection device 210 that detects the external object 205 depending on the respective modes.

A description will be given of an example where the forward detection device 210 set to the first mode identifies the external object 205 with reference to Table 1, which will be described below. In Table 1, which will be described below, a range of a speed (or an interval of a speed) of the vehicle 200 is an example, which is not necessarily limited to a described range (or interval) of the present disclosure. Furthermore, the level of the first signal is divided into first to third levels, but this is for convenience of description. The level of the first signal is not necessarily limited to being divided into three levels.

TABLE 1

| Level of first signal | Type of external object 205 | Motion state of external object 205 | Speed (km/h) of vehicle 200 |
|---|---|---|---|
| First level | Outside vehicle | Stopped state or moving state | 5-180 |
| | Person or person riding in bicycle | Stopped state or moving state | 5-80 |
| Second level | Outside vehicle | Stopped state moving state | 5-60 5-130 |
| | Person or person riding in bicycle | Stopped state or moving state | 5-60 |
| Third level | Outside vehicle | Stopped state Moving state | 5-60 5-130 |
| | Person or person riding in bicycle | Stopped state or moving state | 5-60 |

Referring to Table 1 above, in an embodiment, the forward detection device 210 may identify a type (or a category) of the external object 205. For example, the forward detection device 210 may identify whether the type of the external object 205 corresponds to at least one of an outside vehicle different from the vehicle 200, a person, or a person riding in a bicycle, or any combination thereof.

For example, the forward detection device 210 may identify a motion state of the outside vehicle, based on the type of the external object 205 that is identified as the outside vehicle. The forward detection device 210 may identify a stopped state or a moving state of the outside vehicle included in the external object 205. The forward detection device 210 may transmit a first signal of a first level to the processor in a first speed interval, based on the external object 205 that is identified as the outside vehicle. The forward detection device 210 may transmit the first signal of the first level to the processor, when the speed of the vehicle is greater than or equal to about 5 km/h and is less than or equal to about 180 km/h, based on the outside vehicle that is identified as being in the stopped state or the moving state.

The forward detection device 210 may transmit the first signal of one of the second level or the third level to the processor, in response to the outside vehicle that is identified as being the stopped state and the speed of the vehicle 200 in a second speed interval included in the first speed interval, based on the type of the external object 205 that is identified as the outside vehicle. For example, the second interval may include a speed that is greater than or equal to about 5 km/h or is less than or equal to about 60 km/h.

The forward detection device 210 may transmit the first signal of one of the second level or the third level to the processor, in response to the outside vehicle that is identified as being in the moving state and the speed of the vehicle 200 in a third speed interval included in the first speed interval, based on the external object 205 that is identified as the outside vehicle. For example, the third speed interval may include a speed that is greater than or equal to about 5 km/h or is less than or equal to about 130 km/h.

The forward detection device 210 may transmit the first signal of the second level or the third level to the processor, in response to the speed of the vehicle 200 in the second speed interval, regardless of a motion state of a person or a person that rides in a bicycle, based on the external object 205 being identified as the person or the person riding in the bicycle.

The processor may notify a passenger that the external object 205 is identified, in response to receiving the first signal of the above-mentioned second level, and may apply acceleration including first acceleration to cause the vehicle 200 to brake. For example, the absolute value of the first acceleration may include about 6 m/s². The processor may notify the passenger that the external object 205 is identified, in response to receiving the first signal of the above-mentioned third level, and may apply acceleration including second acceleration with an absolute value greater than the absolute value of the first acceleration to cause the vehicle 200 to brake. For example, the absolute value of the second acceleration may include about 8 m/s².

A description will be given below of an example where the forward detection device 210 set to one of the second mode or the third mode identifies the external object 205 with reference to Table 2 below.

TABLE 2

| Level of first signal | Type of external object 205 | Motion state of external object 205 | Speed (km/h) of vehicle 200 |
|---|---|---|---|
| First level | Outside vehicle | Stopped state or moving state | 5-200 |
|  | Person or person riding in bicycle | Stopped state or moving state | 5-85 |
| Second level | Outside vehicle | Stopped state or moving state | 5-200 |
|  | Person or person riding in bicycle | Stopped state or moving state | 5-60 |
| Third level | Outside vehicle | Stopped state | 5-85 or 5-100 |
|  |  | Moving state | 5-130 |
|  | Person or person riding in bicycle | Stopped state or moving state | 5-65 |

Referring to Table 2 above, in an embodiment, the forward detection device 210 may identify a motion state of the outside vehicle, based on the type of the external object 205 that is identified as the outside vehicle. The forward detection device 210 may identify a stopped state or a moving state of the outside vehicle included in the external object 205. The forward detection device 210 may transmit the first signal of the first level to the processor, in response to the speed of the vehicle 200 being identified in a fourth speed interval, based on the external object 205 that is identified as the outside vehicle. For example, the fourth speed interval may include a speed which is greater than or equal to about 5 km/h and is less than or equal to about 200 km/h.

The forward detection device 210 may transmit the first signal of the first level to the processor, in response to the speed of the vehicle 200 being identified in a fifth speed interval, based on the type of the external object 205 being identified as the person or the person riding in the bicycle. For example, the fifth speed interval may include a speed which is greater than or equal to about 5 km/h and is less than or equal to about 85 km/h.

The processor may notify a user that the external object 205 is identified, in response to receiving the first signal of the first level from the forward detection device 210. For example, the processor may notify the user that the external object 205 is identified, by means of at least one of a speaker provided in the vehicle 200, a display provided in the vehicle 200, a seat vibrator provided in the vehicle 200, a handle vibrator provided in the vehicle 200, or any combination thereof.

The forward detection device 210 may transmit the first signal of the second level to the processor, in response to the speed of the vehicle 200 being identified in the fourth speed interval, based on the type of the external object 205 that is identified as the outside vehicle and that the outside vehicle is identified as being in the stopped state or the moving state.

The forward detection device 210 may transmit the first signal of the second level to the processor, in response to the speed of the vehicle 200 being identified in a sixth speed interval, based on the type of the external object 205 being identified as the person or the person riding in the bicycle. For example, the sixth speed interval may include a speed which is greater than or equal to about 5 km/h and is less than or equal to about 65 km/h.

In an embodiment, the processor may notify the user that the external object 205 is identified, in response to receiving the first signal of the second level, and may apply acceleration including first acceleration to cause the vehicle 200 to brake. For example, the processor may apply the acceleration including the first acceleration together with notifying the user that the external object 205 is identified to cause the vehicle 200 to brake, by way of at least one of a speaker provided in the vehicle 200, a display provided in the vehicle 200, a seat vibrator provided in the vehicle 200, a handle vibrator provided in the vehicle 200, or any combination thereof, in response to receiving the first signal of the second level.

The forward detection device 210 may identify a motion state of the outside vehicle, based on the type of the external object 205 that is identified as the outside vehicle. For example, the forward detection device 210 may transmit the first signal of the third level to the processor, in response to the outside vehicle being identified as being in the stopped state and that the speed of the vehicle 200 is identified in the fifth speed interval.

The forward detection device 210 may transmit the first signal of the third level to the processor, in response to the type of the external object 205 that is identified as the outside vehicle, that the outside vehicle is identified as being in a moving state, and that the speed of the vehicle 200 is identified in a seventh speed interval. For example, the seventh speed interval may include a speed which is greater than or equal to about 5 km/h and is less than or equal to about 130 km/h.

The forward detection device 210 may transmit the first signal of the third level to the processor, in response to the type of the external object 205 being identified as the person or the person riding in the bicycle and that the speed of the vehicle 200 is identified in the sixth speed interval.

The processor may notify the user that the external object 205 is identified, in response to receiving the first signal of the third level, and may apply acceleration including second acceleration (with an absolute value greater than the absolute value of the first acceleration) to cause the vehicle 200 to brake.

The above-mentioned example is the description of the forward detection device 210 set to the second mode. The forward detection device 210 set to the third mode may operate to be different from the second mode, based on the type of the external object 205 that is identified as the outside vehicle and based on the outside vehicle being identified as being in a stopped state. For example, in a specified condition, when the type of the external object 205 is identified as the outside vehicle and when the outside vehicle is identified as being in the stopped state, the forward detection device 210 set to the third mode may transmit the first signal of the third level to the processor, in response to the speed of the vehicle 200 being identified in an eighth speed interval. For example, the eighth speed interval may include a speed which is greater than or equal to about 5 km/h and is less than or equal to about 100 km/h.

The speed intervals where the first signal of the second level or the third level is generated among the above-mentioned speed intervals may be referred to as a specified range. Furthermore, the speed intervals where the first signal of the second level is generated may be referred to as a first specified range, and the speed intervals where the first signal of the third level is generated may be referred to as a second specified range, for example.

As described above, the forward detection device 210 may transmit the first signal of one of the first level, the second level, or the third level to the processor. Receiving the first signal of the second level or the third level (among the first level, the second level, or the third level), the processor may notify the user that the external object 205 is identified and may pull a door handle out from a door part together with causing the vehicle 200 to brake.

For example, the processor may transmit a second signal for pulling the door handle out from a door handle driving device (e.g., a door handle driving device 130 of FIG. 1), based on receiving the first signal of the second level or the third level. For another example, the processor may control an actuator which is directly or indirectly connected with the door handle to control the door handle with its mechanical operation and may pull the door handle out from the door part, based on receiving the first signal of the second level or the third level. The processor may transmit the second signal for pulling the door handle out from the door handle driving device or may control the actuator to pull the door handle out, in response to identifying the first signal causing the vehicle 200 to brake.

When the first signal of the second level or the third level is generated, it may be seen as a case where there is a high possibility that an accident will occur. At this time, although the accident occurs and the battery is destroyed by fire, the processor may pull the door handle out from the door part in advance and may maintain the state where the door handle is pulled out, thus perhaps easily helping a vehicle occupant to be rescued after the accident occurs (because the door handle is pulled out and is accessible for use by a rescuer).

Figure 3:
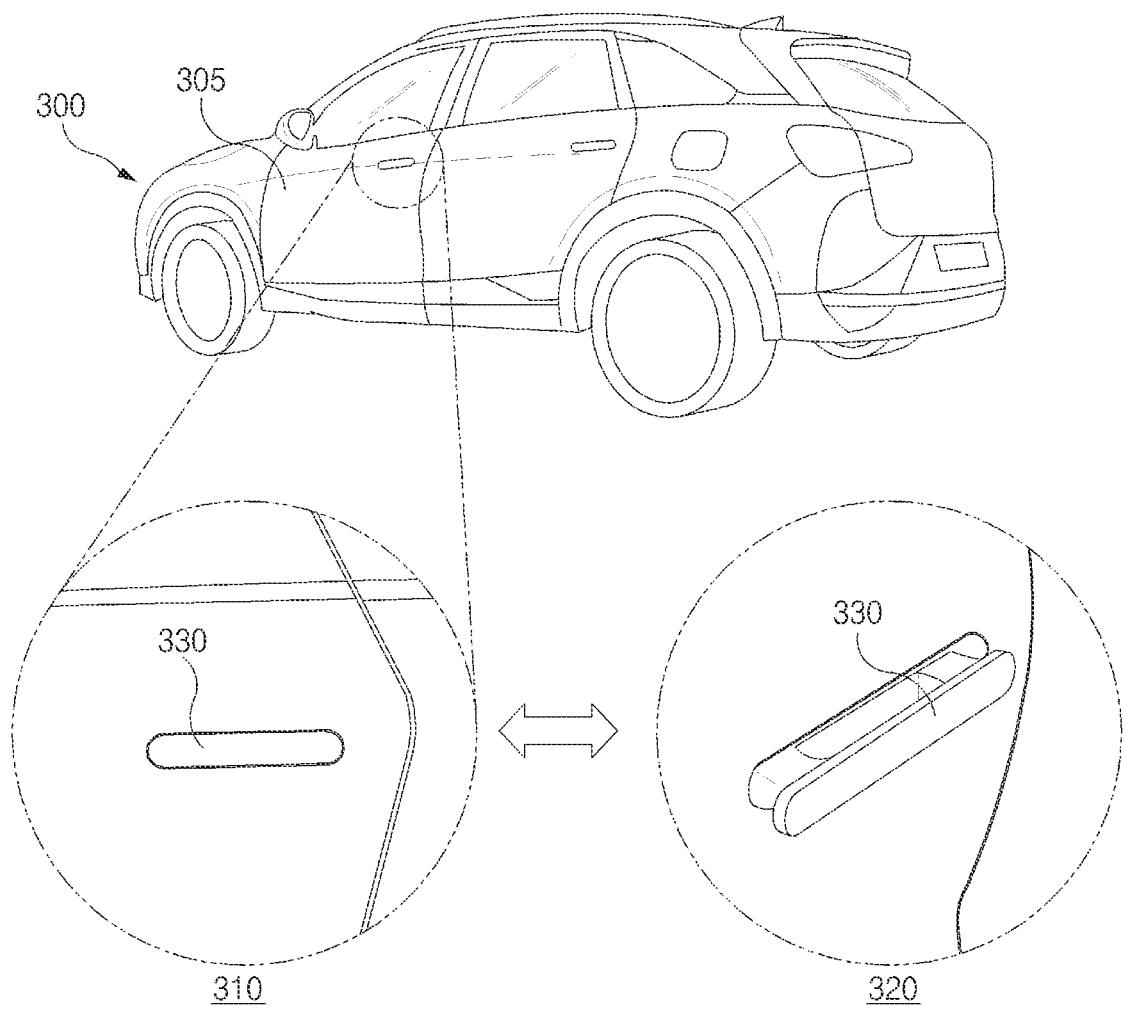
FIG. 3 illustrates an example of a door handle controlled by a vehicle control apparatus according to an embodiment by present disclosure.

FIG. 3 illustrates an example of a door handle controlled by a vehicle control apparatus according to an embodiment of the present disclosure. A vehicle 300 of FIG. 3 may include a vehicle 200 of FIG. 2. The vehicle 300 of FIG. 3 may include all or a part of a vehicle control apparatus 100 of FIG. 1. Operations of FIG. 3 may be performed by the vehicle control apparatus 100 of FIG. 1 or a processor 110 of FIG. 1.

Referring to FIG. 3, the vehicle 300 including the vehicle control apparatus according to an embodiment may include a door part 305. For example, the vehicle 300 may include the at least one door part 305. The door part 305 may include a door handle 330 capable of being pushed in the door part 305 or being pulled out from the door part 305. For example, the door handle 330 may be pushed in the door part 305 or may be pulled out from the door handle 305.

For example, the door handle 330 may be pushed in the door part 305 by a door handle driving device (e.g., a door handle driving device 130 of FIG. 1) or may be pulled out from the driving part 305 by the door handle driving device. For another example, the door handle 330 may be controlled by a processor and may be pushed in the door part 305 or may be pulled out from the door part 305, based on an actuator (not shown) that is directly or indirectly connected with the door handle 330 to perform a mechanical operation.

According to an embodiment, the processor may receive a first signal based on at least one of a distance between the vehicle 300 and an external object (e.g., an external object 205 of FIG. 2) or a speed of the vehicle 300, or any combination thereof from a forward detection device (e.g., a forward detection device 120 of FIG. 1 or a forward detection device 210 of FIG. 2). The processor may transmit a second signal for pulling the door handle 330 out from the door handle driving device, based on receiving the first signal. The door handle driving device may change the door handle 330 from a pushed-in state 310 to a pulled-out state 320 (see FIG. 3), in response to receiving the second signal for pulling the door handle 330 out.

For example, the pushed-in state 310 of the door handle 330 may include a state where the door handle 330 does not protrude to the outside of the door part 305. For example, the pulled-out state 320 of the door handle 330 may include a state where a user is able to manipulate the door handle 330 and open the door part 305 as the door handle 330 protrudes to the outside of the door part 305.

The processor of the vehicle control apparatus according to an embodiment may transmit the second signal for pulling the door handle 330 out from the door part 305 to the door handle driving device, based on the speed of the vehicle 300 that is identified as being less than a specified speed. For example, the specified speed may include a speed of about 5 km/h. When the vehicle 300 is operated at a slow speed, the processor may transmit the second signal for pulling the door handle 330 out from the door handle driving device to protrude the door handle 330 to the outside of the door part 305. Receiving the second signal, the door handle driving device may change from the state 310 where the door handle 330 is pushed in, to the state 320 where the door handle 330 is pulled out. In another embodiment, when the operation of the vehicle 300 starts and the vehicle 300 is in the state 320 where the door handle 330 is pulled out, the processor may maintain the state 320 where the door handle 330 is pulled out.

In another embodiment, the processor of the vehicle control apparatus may control the actuator to pull the door handle 330 out from the door part 305, based on the speed of the vehicle 300 being identified as being less than the specified speed.

Figure 4:
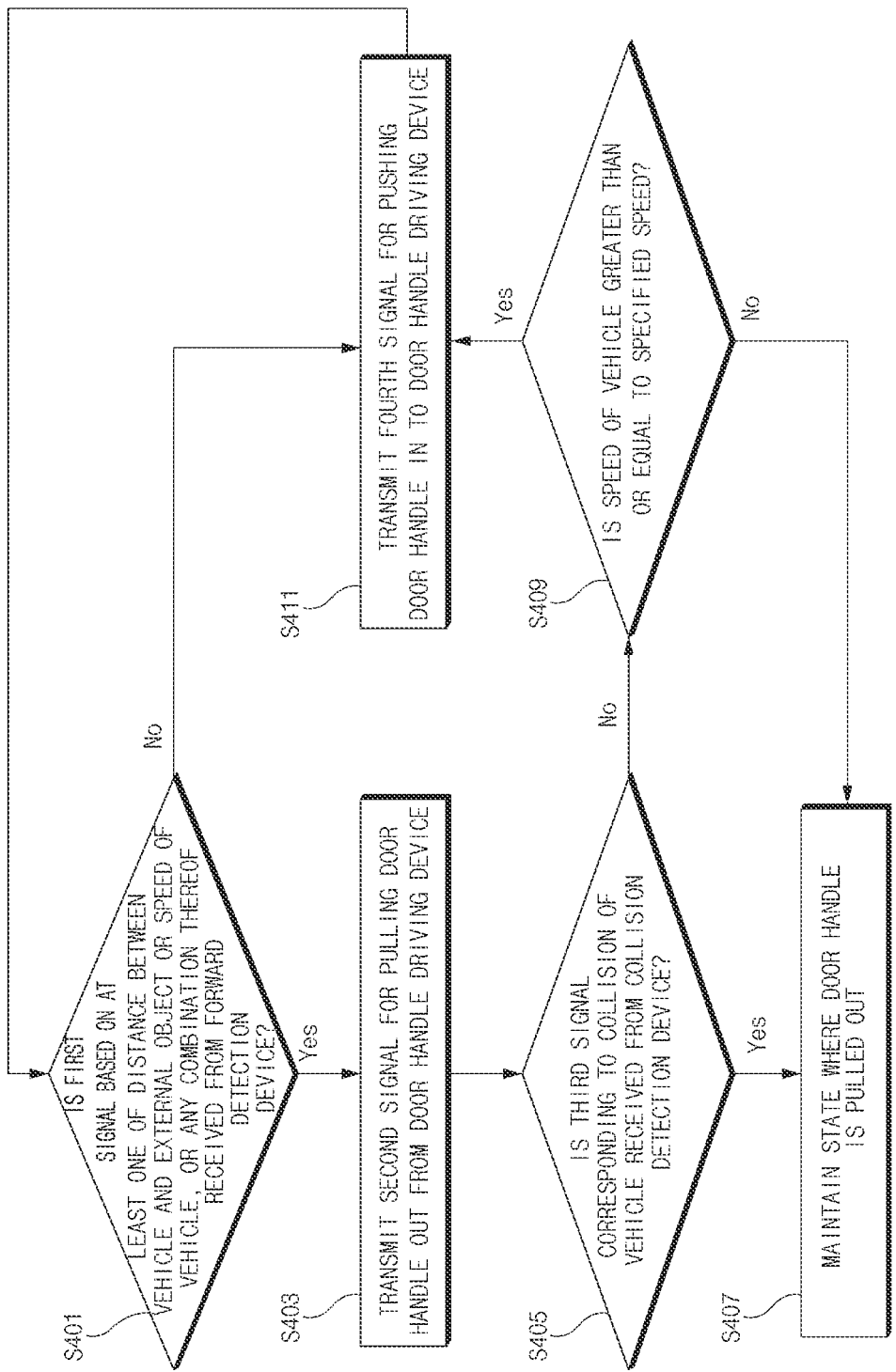
FIG. 4 illustrates an example of a flowchart for describing a vehicle control method according to an embodiment by present disclosure.

FIG. 4 illustrates an example of a flowchart for describing a vehicle control method according to an embodiment of the present disclosure.

Hereinafter, a vehicle control apparatus 100 of FIG. 1 performs a process of FIG. 4, for example. Furthermore, in a description of FIG. 4, an operation described as being performed by a processor of a vehicle control apparatus may be understood as being controlled by a processor 110 of the vehicle control apparatus 100.

Referring to FIG. 4, in operation S401, the processor of the vehicle control apparatus according to an embodiment may identify whether a first signal based on at least one of a distance between a vehicle (e.g., a vehicle 200 of FIG. 2 or a vehicle 300 of FIG. 2) and an external object (e.g., an external object 205 of FIG. 2) or a speed of the vehicle, or any combination thereof, is received from a forward detection device (e.g., a forward detection device 120 of FIG. 1 or a forward detection device 210 of FIG. 2).

For example, when the vehicle is operated at a speed of a specified range, the processor may identify whether the first signal based on at least one of a distance between the vehicle and the external object, a speed of the vehicle, or any combination thereof, is received from the forward detection device.

For example, the first signal transmitted from the forward detection device may include a first signal with one of a first level, a second level, or a third level described with reference to FIG. 2.

When the first signal based on at least one of a distance between the vehicle and the external object, a speed of the vehicle, or any combination thereof, is received from the forward detection device (Yes of operation S401), in operation S403, the processor of the vehicle control apparatus according to an embodiment may transmit a second signal for pulling a door handle out from a door handle driving device. For example, in a state where the door handle is pushed in, the processor may transmit a second signal for pulling the door handle out from the door handle driving device.

In operation S405, the processor of the vehicle control apparatus according to an embodiment may identify whether a third signal corresponding to a collision of the vehicle is received from a collision detection device (e.g., a collision detection device 140 of FIG. 1). For example, the collision detection device may transmit the third signal to the processor, in response to identifying that a force of specified intensity or more acts on at least one of a front surface of the vehicle, a side surface of the vehicle, a rear surface of the vehicle, or any combination thereof.

When the third signal corresponding to the collision of the vehicle is received from the collision detection device (Yes of operation S405), in operation S407, the processor of the vehicle control apparatus according to an embodiment may maintain the state where the door handle is pulled out. As described above, the processor may maintain the state where the door handle is pulled out, based on the third signal corresponding to the collision of the vehicle, and may provide help to open the door part using the door handle after an accident occurs, thus helping a vehicle occupant to be rescued.

When the third signal corresponding to the collision of the vehicle is not received from the collision detection device (No of operation S405) (e.g., within a specified period of time), in operation S409, the processor of the vehicle control apparatus according to an embodiment may identify whether the speed of the vehicle is greater than or equal to a specified speed. For example, the specified speed may include a speed of about 5 km/h. When the speed of the vehicle speed is identified as being less than the specified speed and when the speed of the vehicle is identified as being greater than or equal to the specified speed, the processor may perform different operations.

When the speed of the vehicle is identified as being greater than or equal to the specified speed (Yes of operation S409), in operation S411, the processor of the vehicle control apparatus according to an embodiment may transmit a fourth signal for pushing the door handle into the door handle driving device. For example, the processor may transmit the second signal for pulling the door handle out from the door handle driving device, based on receiving the first signal, may fail to receive the third signal responding to the collision of the vehicle from the collision detection device, in the state where the door handle is pulled out, and may transmit the fourth signal for pushing the door handle into the door handle driving device, based on the speed of the vehicle being identified as greater than or equal to the specified speed.

When not receiving the first signal based on at least one of a distance between the vehicle and the external object, a speed of the vehicle, or any combination thereof, from the forward detection device (No of operation S401), in operation S411, the processor of the vehicle control apparatus according to an embodiment may transmit the fourth signal for pushing the door handle into the door handle driving device. For example, in the state where the door handle is pulled out, the processor may transmit the fourth signal for pushing the door handle into the door handle driving device, based on not receiving the first signal.

As described above, the processor of the vehicle control apparatus according to an embodiment may pull the door handle out from the door part or may push the door handle into the door part, based on at least one of a distance between the vehicle and the external object, a speed of the vehicle, or any combination thereof. The processor may maintain the state where the door handle is pulled out, based on receiving the third signal corresponding to a collision of the vehicle from the collision detection device, in the state where the door handle is pulled out, to easily open the door part, although the battery is destroyed by fire by an accident, and thus helping a vehicle occupant to be rescued after an accident.

Figure 5:
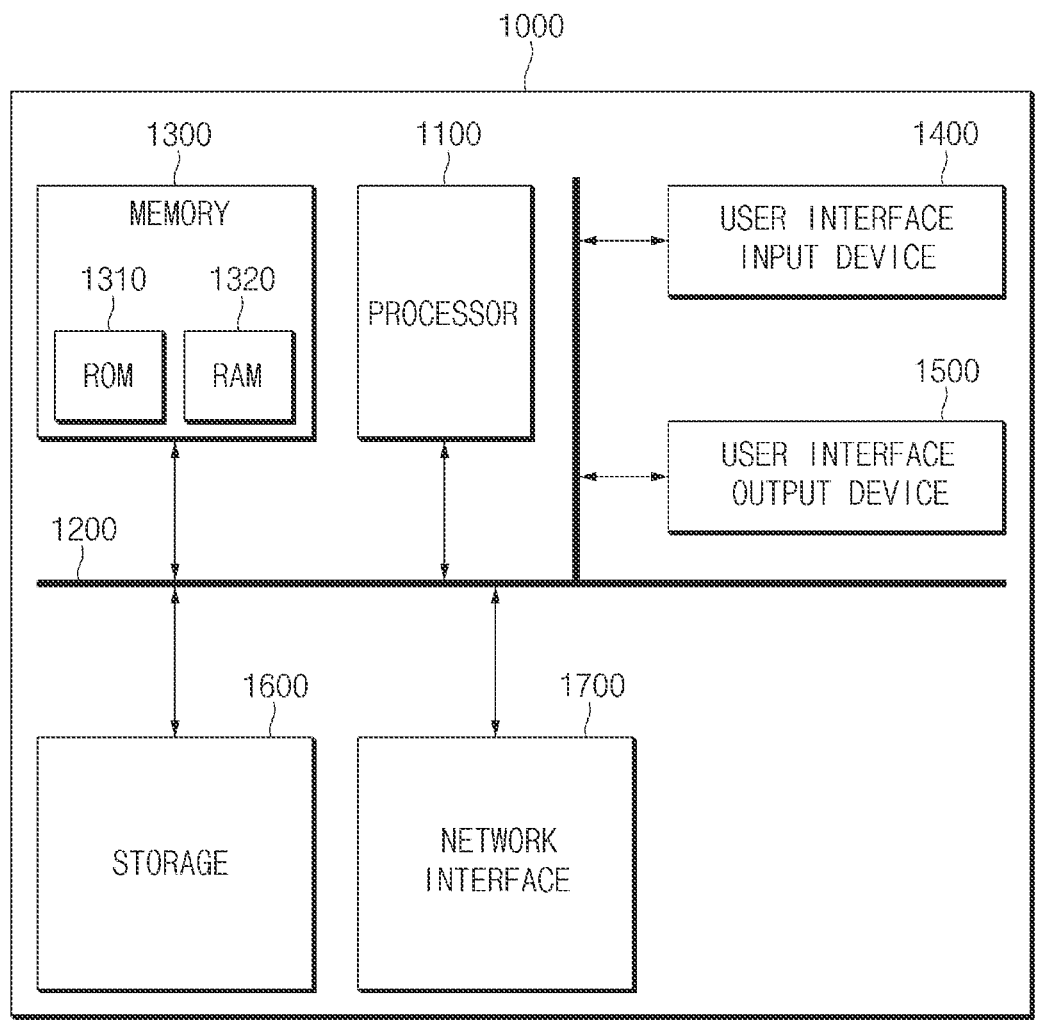
FIG. 5 illustrates an example of a computing system of a vehicle control apparatus, and of a vehicle control method, according to an embodiment of the present disclosure.

FIG. 5 illustrates an example of a computing system about a vehicle control apparatus and a vehicle control method according to an embodiment of the present disclosure.

Referring to FIG. 5, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600, for example. The memory 1300 and the storage 1600 may include various types of volatile and/or non-volatile storage media, for example. For example, the memory 1300 may include a read only memory (ROM) 1310 and a random access memory (RAM) 1320.

Accordingly, the operations of the method or algorithm described in connection with the embodiments disclosed in this specification may be directly implemented with hardware module(s), software module(s), or a combination of hardware module(s) and software module(s), which is executed by the processor 1100. A software module may reside on a storage medium (that is, the memory 1300 and/or the storage 1600) such as a RAM, a flash memory, a ROM, an EPROM, an EEPROM, a register, a hard disc, a removable disk, a CD-ROM, or any combination thereof, for example.

The exemplary storage medium may be coupled to the processor 1100. The processor 1100 may read out information from the storage medium and may write information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

Advantageously, an embodiment may pull a door handle out from a door part, based on at least one of a distance between a vehicle including a vehicle control apparatus and an external object, a speed of the vehicle, or any combination thereof.

Furthermore, an embodiment may maintain a state where the door handle is pulled out, based on identifying a collision of the vehicle including the vehicle control apparatus, in the state where the door handle is pulled out.

Furthermore, an embodiment may maintain a state where the door handle is pulled out from a door part, although the battery is discharged or disconnected (or is destroyed by fire) when the vehicle collides, thus helping the passenger(s) to be rescued after an accident occurs.

Furthermore, an embodiment may pull out the door handle pushed in the door part in advance before an accident occurs to maintain aesthetic appearance and accessibility to the door handle, thus helping the passenger(s) to be rescued after an accident occurs.

In addition, various other advantages and benefits might be ascertained directly or indirectly through the present disclosure.

Although the present disclosure has been described with reference to exemplary embodiments and the accompanying drawings, the present disclosure is not necessarily limited thereto, but may be variously modified and altered by those skilled in the art to which the present disclosure pertains without departing from the spirit and scope of the present disclosure claimed in the following claims.

Therefore, embodiments of the present disclosure are not intended to limit the technical spirit of the present disclosure, but are provided only for illustrative purposes. The scope of the present disclosure should be construed on the basis of the accompanying claims, and all the technical ideas within the scope equivalent to the claims should be included in the scope of the present disclosure.

What is claimed is:

1. A vehicle control apparatus, comprising:
a processor;
a forward detection device configured to identify an external object different from a vehicle, the external object being in front of the vehicle;
a door handle driving device configured to control a position of a door handle relative to a door part of the vehicle; and
a collision detection device configured to identify whether there is a collision of the vehicle,
wherein the processor is configured to:
identify whether a first signal is received from the forward detection device, based on the vehicle being operated at a speed in a specified range, and the first signal being based on one or both of a speed of the vehicle and a distance between the vehicle and the external object;
transmit a second signal for moving the door handle to a first position outward relative to the door part, by the door handle driving device, based on receiving the first signal; and
maintain a state where the door handle is at the first position, based on receiving a third signal from the collision detection device, the third signal corresponding to identifying an occurrence of a collision of the vehicle.

2. The apparatus of claim 1, wherein the processor is configured to transmit a fourth signal for moving the door handle to a second position inward relative to the door part, by the door handle driving device, based on not receiving the third signal from the collision detection device.

3. The apparatus of claim 1, wherein the processor is configured to transmit a fourth signal for moving the door handle to a second position inward relative to the door part, by the door handle driving device, in response to the speed of the vehicle being identified as being greater than or equal to a specified speed, and based on not receiving the third signal from the collision detection device.

4. The apparatus of claim 1, wherein the processor is configured to transmit a fourth signal for moving the door handle to a second position inward relative to the door part, by the door handle driving device, based on not receiving the first signal from the forward detection device, and in response to the vehicle being operated at the speed in the specified range.

5. The apparatus of claim 1, wherein the specified range includes at least one of a first specified range or a second specified range with a maximum value less than a maximum value of the first specified range.

6. The apparatus of claim 5, wherein the processor is configured to apply acceleration including a first acceleration to cause the vehicle to brake, in response to the first signal being received, and based on the speed of the vehicle being identified in the first specified range.

7. The apparatus of claim 6, wherein the processor is configured to apply acceleration including a second acceleration, the second acceleration having an absolute value greater than an absolute value of the first acceleration, to cause the vehicle to brake, in response to the first signal being received, and based on the speed of the vehicle being identified in the second specified range.

8. The apparatus of claim 1, wherein the processor is configured to provide a notification that the external object is identified, by one or more of a speaker provided in the vehicle, a display provided in the vehicle, a seat vibrator provided in the vehicle, in response to the distance between the vehicle and the external object being identified as less than or equal to a specified distance.

9. A vehicle control method, comprising:
identifying whether a first signal based on at least one of a speed of the vehicle or a distance between a vehicle and an external object from a forward detection device configured to identify the external object different from the vehicle is received, the external object being in front of the vehicle when the vehicle is operated at a speed in a specified range;
in response to receiving the first signal, transmitting a second signal for causing a door handle pushed in a door part of the vehicle to be pulled out by a door handle driving device configured to control the door handle; and
maintaining a state where the door handle is pulled out in response to receiving a third signal indicating a collision of the vehicle from a collision detection device in a state where the door handle is pulled out by the door handle driving device responding to receiving the second signal.

10. The vehicle control method of claim 9, further comprising transmitting a fourth signal for pushing the door handle in to the door handle driving device in response to not receiving the third signal from the collision detection device.

11. The vehicle control method of claim 9, further comprising transmitting a fourth signal for pushing in the door handle to the door handle driving device, based on the speed of the vehicle being identified as being greater than or equal to a specified speed in response to not receiving the third signal from the collision detection device.

12. The vehicle control method of claim 9, further comprising transmitting a fourth signal for pushing in the door handle to the door handle driving device in response to not receiving the first signal from the forward detection device, when the vehicle is operated at the speed in the specified range.

13. The vehicle control method of claim 9, wherein the specified range is a first specified range or a second specified range with a maximum value greater than a maximum value of the first specified range.

14. The vehicle control method of claim 13, further comprising applying acceleration including a first acceleration to cause the vehicle to brake, in response to the first signal received based on the speed of the vehicle, the speed being identified as the first specified range.

15. The vehicle control method of claim 14, further comprising applying acceleration including a second acceleration with an absolute value greater than an absolute value of the first acceleration to cause the vehicle to brake, in response to the first signal received based on the speed of the vehicle, the speed being identified as the second specified range.

16. The vehicle control method of claim 9, further comprising providing a notification that the external object is identified, by means of at least one of a speaker provided in the vehicle, a display provided in the vehicle, a seat vibrator provided in the vehicle, or a handle vibrator provided in the vehicle, or any combination thereof, in response to identifying the external object within a specified distance or less.

17. A method of controlling a vehicle, the method comprising:
identifying that an external object is in front of the vehicle;
identifying that the vehicle is being operated at a speed in a specified range and is within a specified distance from the external object;
in response to the vehicle being operated at a speed in the specified range and being within the specified distance from the external object, causing a door handle of the vehicle to be moved to a first position outward relative to a door part of the vehicle;
determining that the vehicle has been involved in a collision; and
in response to the vehicle being involved in a collision, maintaining a state of the door handle in the first position.

18. The vehicle control method of claim 17, wherein the specified range includes either a first specified range or a second specified range with a maximum value less than a maximum value of the first specified range.

19. The vehicle control method of claim 18, further comprising causing the vehicle to brake by a first deceleration amount in response to identifying that the vehicle is being operated at a speed in the first specified range and is within the specified distance from the external object.

20. The vehicle control method of claim 19, further comprising causing the vehicle to brake by a second deceleration amount in response to identifying that the vehicle is being operated at a speed in the second specified range and is within the specified distance from the external object, the second deceleration amount having an absolute value greater than an absolute value of the first deceleration amount.

\* \* \* \* \*